June 13, 1967 — C. E. GRAWEY — 3,325,194
HIGH PRESSURE HYDRAULIC HOSE COUPLING ASSEMBLY
Filed Feb. 23, 1965
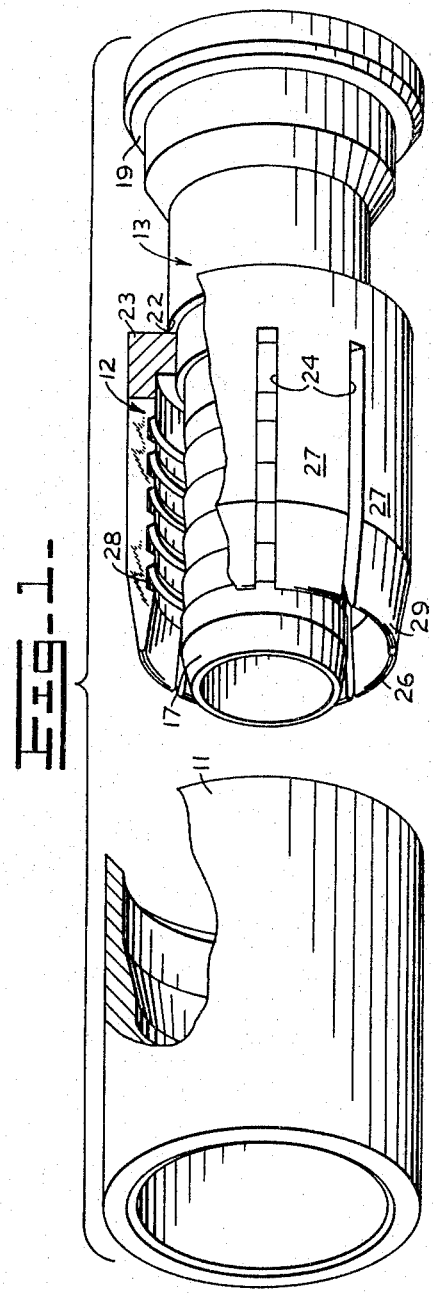
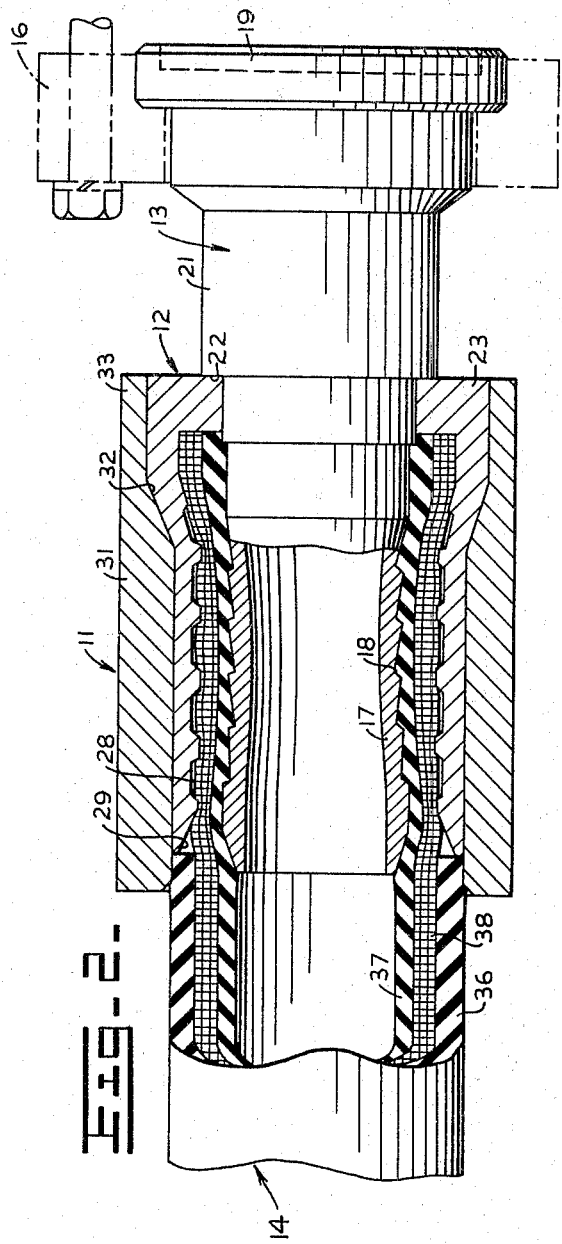
INVENTOR.
CHARLES E. GRAWEY
BY
*Fryer, Tjensvold, Feix & Phillips*
ATTORNEYS

3,325,194
HIGH PRESSURE HYDRAULIC HOSE COUPLING ASSEMBLY

Charles E. Grawey, Peoria, Ill., assignor to Caterpillar Tractor Co., Peoria, Ill., a corporation of California
Filed Feb. 23, 1965, Ser. No. 434,189
4 Claims. (Cl. 285—257)

ABSTRACT OF THE DISCLOSURE

A hose coupling comprising a generally cylindrical inner stem, a collet attached to said stem having fingers terminating in inwardly beveled ends and a sleeve including an inner surface of two different diameter cylinders interconnected by a tapered portion, the coupling when assembled having the sleeve over the collet whereby the collet fingers are forced against a hose placed between the collet and the stem and the beveled ends of the collet fingers are forced into mating relation with the smaller diameter cylindrical surface of the sleeve.

---

The present invention relates to hose couplings and more particularly to a hydraulic hose coupling for use in high pressure (4000–6000 p.s.i.) hydraulic systems.

Hose couplings presently known in the art for use in conjunction with high pressure hydraulic systems are notoriously large and bulky which precludes their use in confined areas or where multiple hose fittings attach to a manifold.

Hose couplings of this type are generally divided into two classes: those which come as original equipment on a machine and require large presses or other non-field type equipment for assembly; and field replacement couplings which can be employed with normal field type equipment which is necessarily smaller and more portable. The hose coupling taught by the present invention eliminates the need for two types of hose couplings in that it provides a coupling with a service life which is equal to or greater than the service life of a hose coupling in the original equipment class and at the same time can be assembled in the field with normal field equipment.

Accordingly it is an object of the present invention to provide a high pressure hydraulic hose coupling of relatively small dimensions.

Further objects of the present invention are to provide a reusable high pressure hydraulic hose coupling having a service life equal to a better than hose couplings presently offered as original equipment and at the same time be capable of installation in the field with the use of normal field equipment.

Further objects and advantages of the present invention are made apparent in the following specification wherein a preferred form of the invention is described by reference to the accompanying drawings.

In the drawings:

FIG. 1 is an isometric illustration of the hose coupling of the present invention wherein certain portions are broken away to more clearly reveal the details of the invention; and FIG. 2 is a side elevation of an assembled hose coupling of the present invention wherein certain portions are shown in section.

Referring now to the drawings, a generally cylindrical hardened steel sleeve 11, a split collet 12 and a stem 13 operatively combine to secure a hydraulic hose 14 to a mating part 16. The stem 13 and collet 12 are made of a malleable material such as SAE 1018 or 1019 steel and are not heat treated. Stem 13 includes a main cylindrical body portion 17 which has a series of radial grooves 18 machined in its outer surface. The stem further includes a somewhat enlarged end portion 19 for connection to a mating part such as 16. Between the end 19 and body portion 17 of stem 13 is an intermediary portion 21 which has a slightly larger diameter than main body portion 17 so as to form a shoulder 22 at the juncture of intermediary portion 21 and main body portion 17.

The split collet 12 is a generally cylindrically formed member having an inwardly directed end flange 23 having an inside diameter less than that of intermediary portion 21 and approximately equal to that of the main body portion 17 of stem 13. The stem and split collet are most advantageously formed separately and then furnace brazed together to form a stem-collet assembly which cooperates with the sleeve 11 to couple the hose 14 to a part such as 16, in the manner to be described. The joinder of collet 12 and stem 13 is made at flange 23 which abuts the shoulder 22.

The collet 12 is formed with a plurality of axial slots 24 which extend from the free end 26 of collet 12 to the flange member 23. These slots are evenly spaced around the collet and define collet fingers 27 which surround the body of stem 17.

The interior surfaces of collet fingers 27 are machined to form grooves 28 which are disposed in facing relationship to the grooves 18 of stem 13. The free end of each collet finger 27 is formed with a radially inwardly directed bevel 29 which assists the sleeve 11 in being operatively disposed about the collet 12.

The sleeve 11 is generally cylindrical in form with a main portion 31 having an inner diameter which is less than the outer diameter of collet 12. The main portion 31 of sleeve 11 is integral with a bevel section 32 wherein the inner diameter of sleeve 11 gradually increases to be approximately equal to the outer diameter of collet 12 at the location of the flange 23. Extending from the bevel section 32 of sleeve 11 is an end portion 33 having the largest internal diameter of any other section of the sleeve 11. Thus the sleeve 11 has an exterior surface which is a right cylinder while the interior of the sleeve is comprised of two sections having defferent diameters joined by a bevel section.

Hose 14 is typical of high pressure hydraulic hoses in that it includes an outer layer 36 of a relatively soft material and an inner liner 37 of the same or similar material separated by a layer of wire reinforcing material 38. For connection to the hose coupling of the present invention, it is necessary to remove the outer layer 36 from the end of hose 14 for a distance approximately equal to the distance between the free end of collet 12 and the inwardly directed flange member 23.

To secure the hose to the coupling, the end with its outer layer 36 stripped away is inserted over the main body 17 of stem 13 until the end of the hose contacts the flange 23. With the hose thus in place, the sleeve 11 is pressed over the collet 12 with the beveled ends 29 of collet fingers 27 engaging the internal bevel 32 of sleeve 11 which results in the fingers 27 being forced radially inward bringing the internal grooves 28 of the collet fingers into holding engagement with the wire reinforcement 38 of hose 14 in a swaging action. The inward motion of finger 27 also compresses the hose liner 37 onto body 17 whereby the stem grooves 18 afford a holding and sealing action in pressing into the liner material.

The use of unhardened steel in the stem 13 and collet 12 permits radial inward deformation of these parts during assembly without breakage and also facilitates removal of the coupling from a section of damaged hose after the sleeve 11 is removed. In the event of hose failure which can be repaired by removal of the coupling and replacement thereof after the hose end has been cut back, or if the coupling were to be reused on a new section of hose, the coupling is readily disassembled after removal of the sleeve 11. The sleeve 11 can be removed in an arbor press or by driving it axially toward the hose 14 through use of a hammer or other impact tool. After removal of the sleeve 11 the collet fingers 27 can be spread with a screw driver and the hose can be removed from the stem body portion 17. Before the coupling is reused, the stem 13 must be resized by driving a mandrel or ball of proper diameter through the stem bore. After resizing of the stem, the coupling can be installed on a new section of hose.

The use of unhardened steel in the stem 13 has a further advantage of compensating for variations in hose size within given tolerances. The dimensions of the coupling are such that it will allow proper gripping action in a tight liquid seal on a hose which is at the low end of the specification tolerance scale. As an example, the specification for one inch hose calls for the outside diameter tolerance of plus or minus .047 inch. From this, it can be seen that if the coupling dimension were designed for the mid range of the tolerance, it might not seal on a hose at the low end of the tolerance. By designing for the low end of the tolerance range, the variation in the thickness of a hose is taken up by the degree of deformation of the body portion 17 of stem 13 in response to the sleeve 11 being swaged over the collet 12.

In addition to the deformation of the body portion 17 of stem 13 when the sleeve 11 is swaged over the collet 12, deformation also occurs at the free end of collet finger 27. As illustrated in FIG. 2, the bevel 29 is straightened by the swaging action as the sleeve 11 is pressed over the collet. This causes the bevel 29 to transfer to the underside of the end of the collet finger 27 forming a definite outward arc. This arc provides a degree of relief at the end of the collet which enables the hose to flex in that area without breaking the layer of reinforcing material which so often is the first step toward hose failure.

No retaining means is required for sleeve 11 after assembly since the only force acting thereon during use of the hose assembly is radially outward. The metal to metal press fit between the collet 12 and sleeve 11 is sufficient to prevent axial dislocation of the sleeve after assembly.

The coupling taught by the present invention has relatively small dimensions which enables it to be employed where space is limited or where large numbers of hoses must be connected to a common member. The size of the coupling however does not result in a reduction in its service life which in fact is equal to or greater than large original equipment type hose fittings presently known in the art. The strength of the coupling has been tested in the 10,000 to 12,000 p.s.i. range wherein rupture has occurred due to failure of the hose while the coupling remained intact.

I claim:
1. In a high pressure hydraulic hose coupling assembly, the combination comprising:
a generally cylindrical, hollow, stem member;
a split generally cylindrical collet secured at one end to said stem member and being co-axial therewith, said collet having a plurality of collet fingers extending from said one end to the other end thereof and radially spaced from said stem member, each of said collet fingers terminating in a radially inward shaped surface, said stem member and said collet fingers defining a cylindrical space for receiving a hydraulic hose; and
a hollow cylindrical sleeve member, said sleeve having an interior surface comprising a first constant diameter cylindrical portion adjacent one end, said first diameter being approximately equal to the outer diameter of said collet, a second constant diameter cylindrical portion of smaller diameter than said first portion adjacent the other end, said second diameter being less than that of the collet and greater than that of the stem and a tapered portion intermediate the ends connecting said first and second cylindrical portions; whereby when said sleeve is axially forced over said collet member and the hose is compressed between said collet and said stem, the collet outer surface becomes substantially identical to the inner surface of said sleeve.

2. The hose coupling assembly of claim 1 wherein said stem member is further described as having radial grooves formed in its outer surface.

3. The hose coupling assembly of claim 2 wherein said collet and said stem are formed from unhardened malleable material and said sleeve is formed from a material which has been hardened.

4. The hose coupling assembly of claim 3 wherein said collet fingers have radial grooves formed in the surface which faces said stem member.

References Cited
UNITED STATES PATENTS

| | | | |
|---|---|---|---|
| 1,532,886 | 4/1925 | Cowles | 285—243 |
| 2,120,275 | 6/1938 | Cowles | 285—243 X |
| 2,341,003 | 2/1944 | Watson | 285—256 |
| 2,445,599 | 8/1948 | Knaggs | 285—243 |
| 3,189,370 | 6/1965 | Marshall | 285—243 X |
| 3,191,975 | 6/1965 | La Marre et al. | 285—243 |

CARL W. TOMLIN, *Primary Examiner.*
THOMAS F. CALLAGHAN, *Examiner.*